US012704581B2

(12) United States Patent
Cui et al.

(10) Patent No.: US 12,704,581 B2
(45) **Date of Patent: *Aug. 11, 2026**

(54) RSTD MEASUREMENT REPORT MAPPING FOR NR POSITIONING

(71) Applicant: Apple Inc., Cupertino, CA (US)

(72) Inventors: Jie Cui, San Jose, CA (US); Yang Tang, San Jose, CA (US); Dawei Zhang, Saratoga, CA (US); Zhibin Wu, Los Altos, CA (US); Yuchul Kim, San Jose, CA (US); Hong He, San Jose, CA (US); Yushu Zhang, Beijing (CN); Haitong Sun, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,687

(22) Filed: Jun. 20, 2024

(65) Prior Publication Data

US 2024/0337719 A1 Oct. 10, 2024

Related U.S. Application Data

(63) Continuation of application No. 17/593,584, filed as application No. PCT/CN2020/074829 on Feb. 12, 2020, now Pat. No. 12,038,520.

(51) Int. Cl.
*G01S 5/00* (2006.01)
*G01S 5/02* (2010.01)
(Continued)

(52) U.S. Cl.
CPC .......... *G01S 5/0036* (2013.01); *G01S 5/0284* (2013.01); *H04L 5/0051* (2013.01); *H04L 27/26025* (2021.01); *H04W 24/10* (2013.01)

(58) Field of Classification Search
CPC ........ G01S 5/0036; G01S 5/0284; G01S 5/10; H04L 5/0051; H04L 27/26025; H04W 24/10; H04W 64/00
(Continued)

(56) References Cited

U.S. PATENT DOCUMENTS

2017/0171857 A1* 6/2017 Lee .......................... G01S 13/16
2017/0276761 A1* 9/2017 Park ....................... G01S 5/0242
(Continued)

FOREIGN PATENT DOCUMENTS

| CN | 106664591 | 5/2017 |
|---|---|---|
| CN | 110121907 | 8/2019 |
| KR | 1020190127560 | 11/2019 |

OTHER PUBLICATIONS

CATT, "Discussion on RSTD Measurement Report Mapping"; 3GPP TSG-RAN WG4 Meeting #93, R4-1913719, Nov. 18-22, 2019, 3 sheets.

*Primary Examiner* — Don N Vo
(74) *Attorney, Agent, or Firm* — Fay Kaplun & Marcin, LLP

(57) ABSTRACT

A method, UE and integrated circuit for reporting RSTD values to a network. A user equipment (UE) is configured to establish a connection to a network, the network comprising a first cell and a second cell. The UE receives a positioning reference signal from each of the first and second cells, determines a frequency band for each of the positioning reference signals, determines reference signal time difference (RSTD) values from measured time offsets between the positioning reference signals from the first and second cells, determines RSTD reporting values based on at least the RSTD values and the determined frequency bands and transmits an indication of the RSTD reporting values to the network.

20 Claims, 4 Drawing Sheets

(51) Int. Cl.
*H04L 5/00* (2006.01)
*H04L 27/26* (2006.01)
*H04W 24/10* (2009.01)

(58) Field of Classification Search
USPC .......................................................... 455/456.1
See application file for complete search history.

(56) References Cited

U.S. PATENT DOCUMENTS

| | | | | |
|---|---|---|---|---|
| 2018/0302873 | A1* | 10/2018 | Kazmi | H04W 24/10 |
| 2019/0261308 | A1 | 8/2019 | Razavi et al. | |
| 2020/0351813 | A1* | 11/2020 | Manolakos | H04W 24/10 |
| 2021/0058890 | A1* | 2/2021 | Akkarakaran | G01S 5/0221 |

* cited by examiner

RSTD MEASUREMENT REPORT MAPPING FOR NR POSITIONING

BACKGROUND

Observed time distance of arrival (OTDOA) is a multilateration technique where a user equipment (UE) receives a positioning reference signal (PRS) from each of a plurality of network cells. The UE determines precise offsets between the arrival times of the PRSs to generate a set of reference signal time difference (RSTD) values to report to the network. The granularity with which the reports are made may affect the OTDOA performance. For example, a finer granularity may improve the accuracy of the measurements but increase the amount of reporting and network overhead required to report the measurements, while a coarser granularity may be less accurate but reduce the amount of reporting and the network overhead required to report the measurements.

SUMMARY

According to some exemplary embodiments, a method may be performed by a user equipment (UE) configured to establish a connection to a network, the network comprising a first cell and a second cell. The method includes receiving a positioning reference signal from each of the first and second cells, determining a frequency band for each of the positioning reference signals, determining reference signal time difference (RSTD) values from measured time offsets between the positioning reference signals from the first and second cells, determining RSTD reporting values based on at least the RSTD values and the determined frequency bands and transmitting an indication of the RSTD reporting values to the network.

According to other exemplary embodiments, a user equipment (UE) is provided. The UE includes a transceiver configured to establish a connection to a network, the network comprising a first cell and a second cell, the transceiver receiving a positioning reference signal from each of the first and second cells. The UE also includes a processor configured to determine a frequency band for each of the positioning reference signals, determine reference signal time difference (RSTD) values from measured time offsets between the positioning reference signals from the first and second cells, and determine RSTD reporting values based on at least the RSTD values and the determined frequency bands. The transceiver transmits an indication of the RSTD reporting values to the network.

According to still other exemplary embodiments, an integrated circuit us provided. The integrated circuit includes circuitry configured to establish a connection to a network, the network comprising a first cell and a second cell, circuitry configured to receive a positioning reference signal from each of the first and second cells, circuitry configured to determine a frequency band for each of the positioning reference signals, circuitry configured to determine reference signal time difference (RSTD) values from measured time offsets between the positioning reference signals from two cells, circuitry configured to determine RSTD reporting values based on at least the RSTD values and the determined frequency bands and circuitry to transmit an indication of the RSTD reporting values to the network.

DETAILED DESCRIPTION

Figure 1:
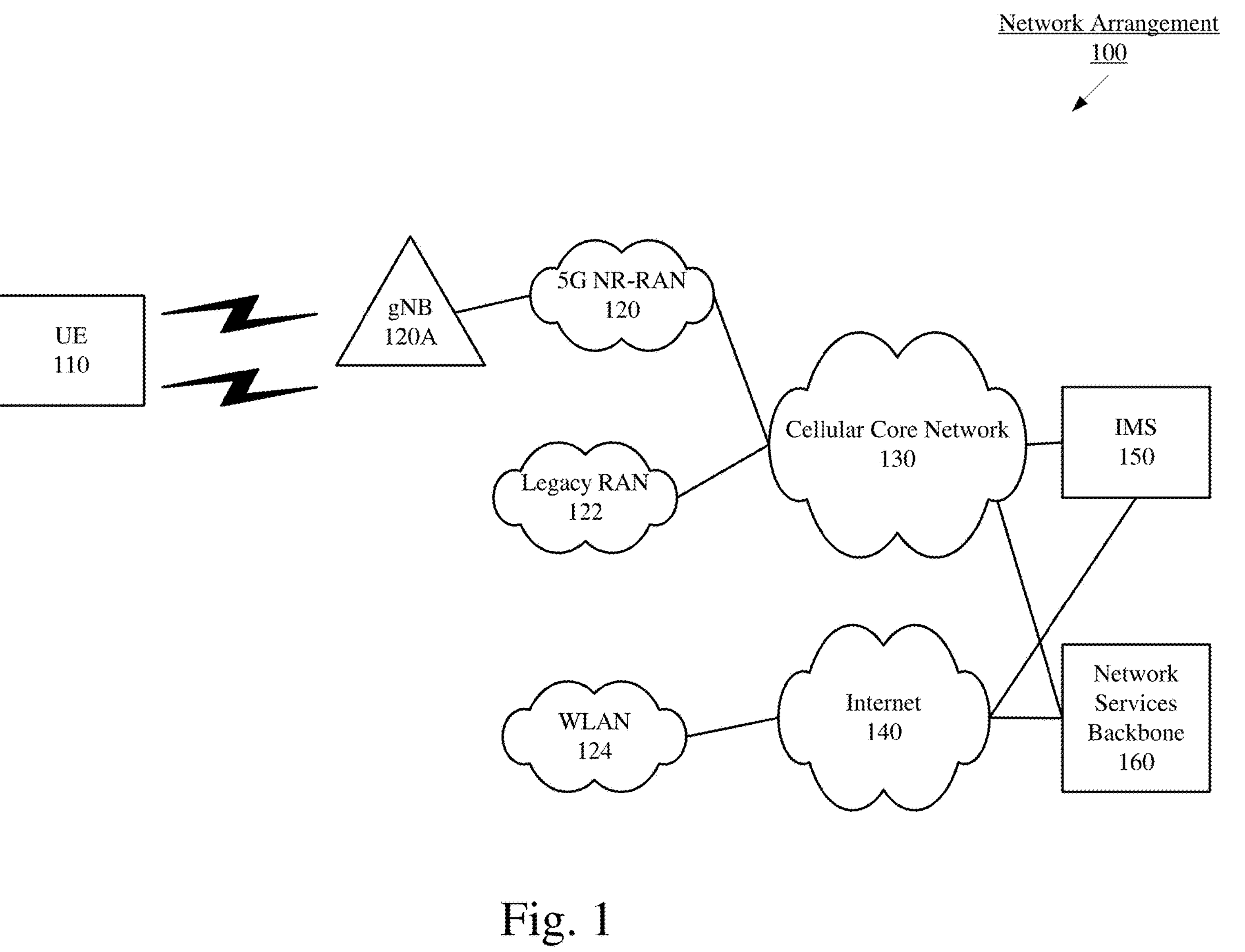
FIG. 1 shows a network arrangement according to various exemplary embodiments.

The exemplary embodiments may be further understood with reference to the following description and the related appended drawings, wherein like elements are provided with the same reference numerals. The exemplary embodiments describe a device, system and method for reporting reference signal time difference (RSTD) values to a network for observed time difference of arrival (OTDOA) positioning. Specifically, the exemplary embodiments provide RSTD measurement report mapping frameworks for a variable measurement granularity in a 5G New Radio (NR) network based on various network connection considerations to be described in detail below.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is provided only for illustrative purposes.

The UE 110 may be configured to communicate with one or more networks. As mentioned previously, the exemplary embodiments will be described relative to UEs capable of connecting to a 5G new radio (NR) radio access network (5G NR-RAN) 120. However, those skilled in the art will understand that the exemplary embodiments may also be applicable to other RANs. In the example of the network configuration 100, the networks with which the UE 110 may wirelessly communicate with are the 5G NR-RAN 120, a legacy RAN 122 and a wireless local access network (WLAN) 124. Therefore, the UE 110 may include a 5G NR chipset to communicate with the 5G RAN 120, a legacy chipset to communicate with the legacy RAN 122 and an ISM chipset to communicate with the WLAN 124. However, the UE 110 may also communicate with other types of wireless networks and the UE 110 may also communicate with networks over a wired connection.

The 5G-RAN 120 and the legacy RAN 122 may be portions of cellular networks that may be deployed by cellular service providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G-RAN 120 via a next generation Node B (gNB) 120A. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and other types of network may be used in accordance with the exemplary embodiments described herein. For example, the UE 110 may also connect to the Legacy RAN 122.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110, 112 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
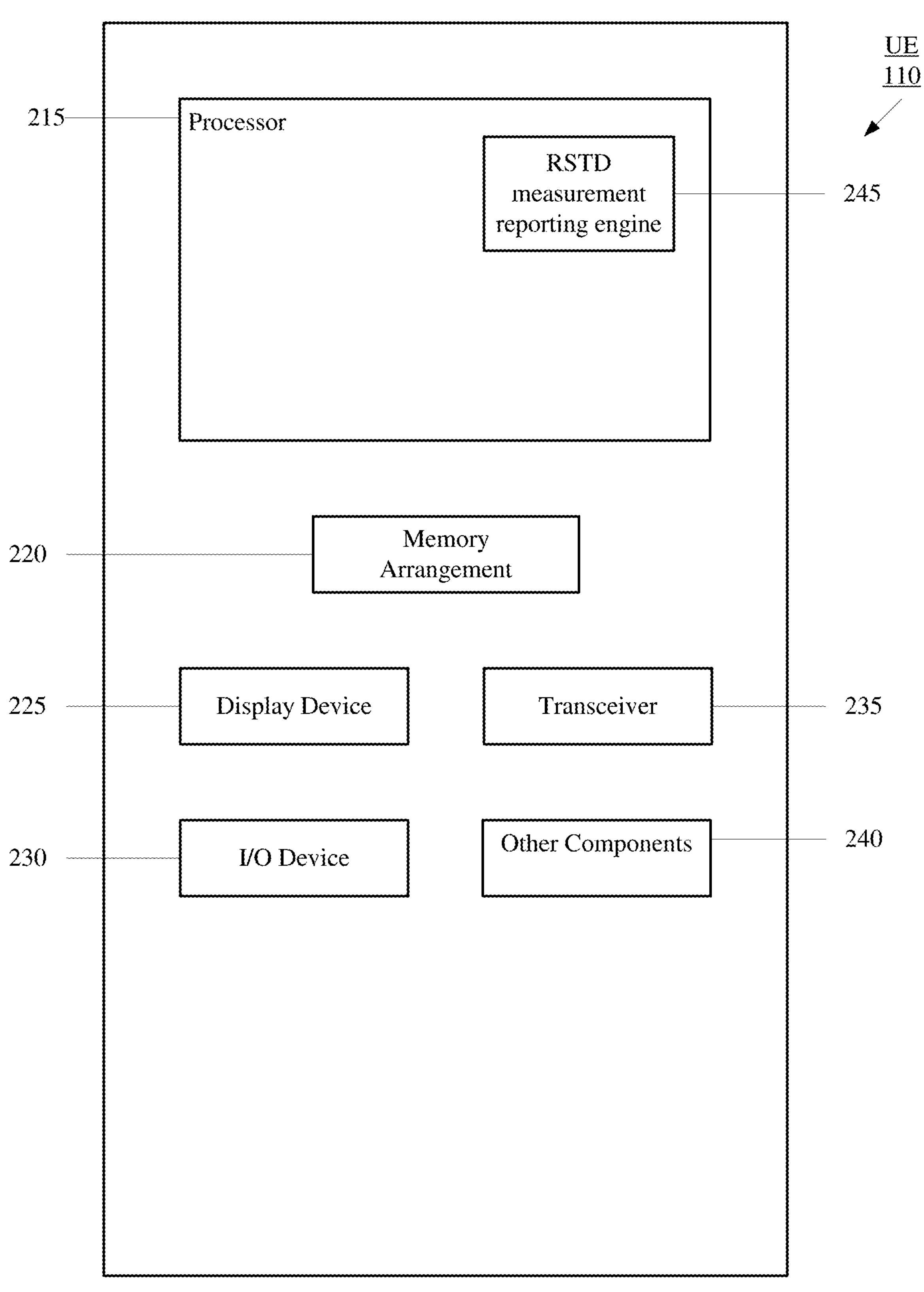
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a first SIM (SIM 1), a second SIM (SIM 2), an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an RSTD measurement reporting engine 245. The RSTD measurement reporting engine 245 may process PRSs received from each of a plurality of gNBs and generate a report for the measured RSTD values for transmission to the network. The manner by which these RSTD values are reported and the granularity associated therewith will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an application processor. The exemplary embodiments may be implemented in any of these or other configurations of a UE.

The memory 210 may be a hardware component configured to store data related to operations performed by the UE 110. As will be described in further detail below, the memory 210 may store data associated with the RSTD value reporting framework of the UE 110. The display device 215 may be a hardware component configured to show data to a user while the I/O device 220 may be a hardware component that enables the user to enter inputs. The display device 215 and the I/O device 220 may be separate components or integrated together such as at a touchscreen. The transceiver 225 may be a hardware component configured to establish a connection with the 5G NR-RAN 120, the legacy RAN 122, the WLAN 124, etc. Accordingly, the transceiver 225 may operate on a variety of different frequencies or channels (e.g., set of consecutive frequencies).

Figure 3:
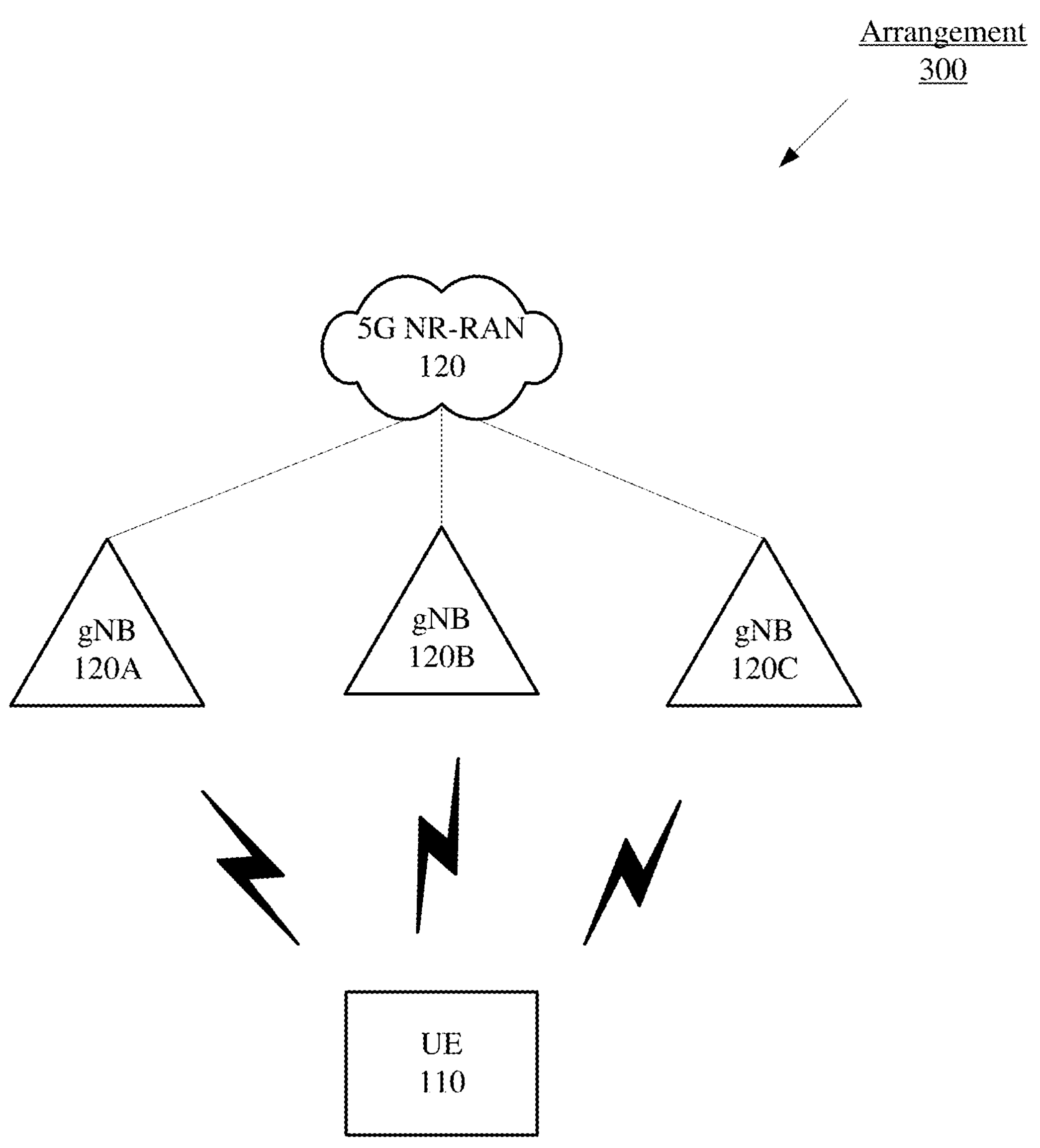
FIG. 3 shows an exemplary system arrangement that includes the UE of FIG. 1 configured for OTDOA functionality having a network connection to a network cell and being capable of receiving positioning signals from a plurality of further network cells according to various exemplary embodiments.

FIG. 3 shows an exemplary system arrangement 300 that includes the UE 110 configured for OTDOA functionality having a network connection to a network cell and being capable of receiving positioning signals from a plurality of further network cells according to various exemplary embodiments. FIG. 3 will be described relative to the network arrangement 100 of FIG. 1 and the UE 110 of FIG. 2.

The exemplary system arrangement 300 illustrates the UE 110 configured with a network connection to the 5G NR radio access network (RAN) 120, i.e., a network connection via gNB 120A. The UE 110 may further be operable to receive signals from a gNB 120B and a gNB 120C without establishing a dedicated connection. However, the UE 110 may establish further network connections with further network cells and/or receive signals therefrom. An OTDOA measurement uses signaling from at least three cells, but, because each individual measurement has a level of uncertainty associated therewith, more cells may be used to increase the accuracy of the measurement.

OTDOA is a downlink (DL) positioning procedure where a user equipment (UE) receives a positioning reference signal (PRS) from at least three network cells and determines a time of arrival (TOA) for each of the PRSs. A first cell is selected as a reference cell and a time difference between the TOA of the first cell and each of the TOAs of the remaining cells is calculated. The relative time difference between two of the cells is the reference signal time difference (RSTD) measurement. So, in the arrangement of FIG. 3 comprising gNBs 120A, 120B and 120C, gNB 120A may be selected as the reference cell and the relative time difference between the TOAs of gNB 120A and 120B and the relative time difference between the TOAs of gNB 120A and gNB 120C may be the RSTD measurements for the OTDOA procedure. The reporting granularity for UE/gNB timing measurements in 5G NR is defined as Equation 1: $T=T_c 2^k$, where k is a configuration parameter with a minimum value of 0 and Tc is a baseline time granularity unit. In other words, the finest reporting granularity is $T_c$ (where k=0), while other reporting granularities such as $2T_c$ (where k=1), $4T_c$ (where k=2), $8T_c$ (where k=3), etc. may be used. The baseline granularity unit for UE/eNB timing measurements in Long Term Evolution (LTE) networks is $T_s$, where $T_s=64T_c$. The basic RSTD reporting granularity for LTE is $1.0T_s$, with a higher resolution being $0.5T_s$. The reporting granularity for 5G NR may be much finer than for LTE. $T_s$ has a value of 1/(15000*2048), as determined by the granularity equation (Equation 2) provided below, using an SCS value of 15 kHz and a FFT size of 2048, which equals approximately 32 ns. $T_s$ correlates to approximately 9.8 meters, i.e. the distance a radio signal travels in $T_s$ seconds. Thus, $T_c$ equals approximately 0.5 ns and correlates to approximately 15 cm.

In LTE, RSTD values may be reported to the network using an RSTD report mapping table (labeled Table 1 herein) below, specified in TS36.133 Table 9.1.10.3-1, where a measured RSTD quantity value correlates to a RSTD reported value ranging between RSTD_0000 to RSTD_12711. This LTE RSTD report mapping table may be used for RSTD reporting in 5G NR. However, the exemplary embodiments may further include a supplementary table, e.g. a relative quantity value table. These tables will be described in further detail below.

TABLE 1

(LTE)
Table 9.1.10.3-1: RSTD report mapping

| Reported Value | Measured Quality Value | Unit |
|---|---|---|
| RSTD_0000 | −15391 > RSTD | $T_2$ |
| RSTD_0001 | −15391 ≤ RSTD < −15386 | $T_2$ |
| . . . | . . . | . . . |
| RSTD_2258 | −4106 ≤ RSTD < −4101 | $T_2$ |
| RSTD_2259 | −4101 ≤ RSTD < −4096 | $T_2$ |
| RSTD_2260 | −4096 ≤ RSTD < −4095 | $T_2$ |
| RSTD_2261 | −4095 ≤ RSTD < −4094 | $T_2$ |
| . . . | . . . | . . . |
| RSTD_6353 | −3 ≤ RSTD < −2 | $T_2$ |
| RSTD_6354 | −2 ≤ RSTD < −1 | $T_2$ |
| RSTD_6355 | −1 ≤ RSTD < 0 | $T_2$ |
| RSTD_6356 | 0 < RSTD ≤ 1 | $T_2$ |
| RSTD_6357 | 1 < RSTD ≤ 2 | $T_2$ |
| RSTD_6358 | 2 < RSTD ≤ 3 | $T_2$ |
| . . . | . . . | . . . |
| RSTD_10450 | 4094 < RSTD ≤ 4095 | $T_2$ |
| RSTD_10451 | 4095 < RSTD ≤ 4096 | $T_2$ |
| RSTD_10452 | 4096 < RSTD ≤ 4101 | $T_2$ |
| RSTD_10453 | 4101 < RSTD ≤ 4106 | $T_2$ |
| . . . | . . . | . . . |

TABLE 1-continued (LTE)
Table 9.1.10.3-1: RSTD report mapping

| Reported Value | Measured Quality Value | Unit |
|---|---|---|
| RSTD_12709 | 15381 < RSTD ≤ 15386 | $T_2$ |
| RSTD_12710 | 15386 < RSTD ≤ 15391 | $T_2$ |
| RSTD_12711 | 15391 < RSTD | $T_2$ |

The reported RSTD values in Table 1, and similarly for the corresponding 5G NR RSTD report mapping table to be described below, may be subdivided into ranges sharing common reporting characteristics, to be explained further below. A first range from RSTD_0001 to RSTD_2259 may be referred to as "range 1," a second range from RSTD_2260 to RSTD_10451 may be referred to as "range 2," and a third range from RSTD_10451 to RSTD_12710 may be referred to as "range 3." In other embodiments, the ranges may be differently defined. The reported relative quantity values for the 5G NR RSTD relative quantity value report mapping table to be described below, may be dependent on radio link factors such as a radio link condition, signal-to-noise ratio (SNR), a line of sight between the UE and the network cell, etc. For example, a coarser granularity may be used for a poor radio link and a finer granularity may be used for a good radio link.

In 5G NR, the time chip granularity used by a UE is decided by the subcarrier spacing (SCS) of the received PRS and the Fast Fourier Transform (FFT) size for decomposing the received signal, as shown by Equation 2:

$$\text{Granularity} = \frac{1}{\Delta f * N_f},$$

where Δf denotes the SCS size and $N_f$ denotes the FFT size. The FFT size used by the UE is the smallest FFT size available to decompose a given number of resource blocks (RBs) without oversampling. As would be known to those skilled in the art, the FFT size may be e.g. 512, 1024, 2048, 4096, etc. Thus, to give an example, if the maximum transmission bandwidth configuration number ($N_{rb}$) for a received PRS signal is 160, the total SCS size number is 160*12=1920 (i.e. 12 subcarriers for each RB) and the smallest FFT size without oversampling would be 2048. $N_{rb}$ may be determined based on Table 2 and Table 3 given an SCS value and a bandwidth (BW) value, as shown below.

TABLE 2

Maximum transmission bandwidth configuration $NR_S$

| SCS (kHz) | 5 MHz $N_{RS}$ | 10 MHz $N_{RS}$ | 15 MHz $N_{RS}$ | 20 MHz $N_{RS}$ | 25 MHz $N_{RS}$ | 30 MHz $N_{RS}$ | 40 MHz $N_{RS}$ | 50 MHz $N_{RS}$ | 60 MHz $N_{RS}$ | 80 MHz $N_{RS}$ | 90 MHz $N_{RS}$ | 100 MHz $N_{RS}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Maximum transmission bandwidth configuration $N_{RS}$ | | | | |
|---|---|---|---|---|
| SCS (kHz) | 50 MHz $N_{RS}$ | 100 MHz $N_{RS}$ | 200 MHz $N_{RS}$ | 400 MHz $N_{RS}$ |
| 60 | 66 | 132 | 264 | N.A. |
| 120 | 32 | 66 | 132 | 264 |

Thus, from the foregoing, a maximum transmission bandwidth configuration $N_{rb}$ for the PRS may be determined from the PRS SCS (Δf) and BW, and the smallest FFT size is determined from $N_{rb}$.

The maximum channel bandwidth (CBW) for a given SCS on a given frequency band (FR1 or FR2), e.g. the maximum PRS measurement BW (PRB) can also be determined from Tables 2-3. The table value is reduced to an increment of 12, as shown in Table 4 below summarizing the PRB range for a given SCS on a given frequency band. It is noted that certain SCS and CBW combinations from Tables 2-3 (specifically, the combinations of 1) SCS=30 kHz and CBW=5 MHz, 2) SCS=60 kHz and CBW=10 MHz, and 3) SCS=60 kHz and CBW=15 MHz) are excluded from this maximum CBW determination. These combinations are excluded because they represent RSTD measurements that are unlikely to occur in operation. However, based on the information provided herein, those of skill in the art will understand the manner of determining and using the CBW for these combinations.

TABLE 4

| | | PRS measurement BW range (PRBS) | Note |
|---|---|---|---|
| SCS FR1 | 15 kHz | 24~268 | The limitation of CBW is up to 270 RBs, so up to 268 RBs PRS could be configured |
| | 30 kHz | 24~272 | The limitation of CBW is up to 273 RBs, so up to 272 RBs PRS could be configured. We think UE shall not be required to meet requirement for RSTD measurement in case of "SCS = 33 kHz && CBW = 5 MHz |
| | 60 kHz | 24~132 | The limitation of CBW is up to 135 RBs, so up to 132 RBs could be configured. We think UE shall not be required to meet requirement for RSTD measurement in case of "SCS = 60 kHz && CBW = 10 MHz " and "SCS = 60 kHz && CBW = 15 MHz" |
| SCS FR2 | 60 kHz | 24~264 | The limitation of CBW is up to 264 RBs, so up to 264 RBs PRS could be configured |
| | 120 kHz | 24~264 | The limitation of CBW is up to 264 RBs, so up to 264 RBs PRS could be configured |

Within the PRB range, as shown above, the FFT size and time chip granularity can be derived. This is summarized in Table 5 below. It is noted that the granularity for 5G NR is specified to not exceed $1.0T_s$ ($64T_c$), so when a granularity coarser than $64T_c$ is determined from the above calculations the baseline granularity of $64T_c$ is used.

TABLE 5

| FFT size without OS | | PRS measurement BW range (PRBs) | Smallest FFT size | Basic time chip granularity without oversampling | Note |
|---|---|---|---|---|---|
| SCS FR1 | 15 kHz | 24~40 | 512 | 64 Tc | 1/(512*15 k) = 266 Tc > 64 Tc, so we choose 64 Tc as baseline |
| | | 44~84 | 1024 | 64 Tc | 1/(1024*15 k) = 126 Tc > 64 Tc , so we choose 64 Tc as baseline |
| | | 88~168 | 2048 | 64 Tc | |
| | | 172~268 | 4096 | 32 Tc | |
| | 30 kHz | 24~40 | 512 | 64 Tc | 1/(512*30 k) = 126 Tc > 64 Tc, so we choose 64 Tc as baseline |
| | | 44~84 | 1024 | 64 Tc | |
| | | 88~168 | 2048 | 32 Tc | |
| | | 168~272 | 4096 | 18 Tc | |
| | 60 kHz | 24~40 | 512 | 1/(512*60 k) = 64 Tc | |
| | | 44~84 | 1024 | 32 Tc | |
| | | 88~132 | 2048 | 16 Tc | |
| SCS FR2 | 60 kHz | 24~40 | 512 | 1/(512*60 k) = 64 Tc | |
| | | 44~84 | 1024 | 32 Tc | |
| | | 88~168 | 2048 | 16 Tc | |
| | | 172~264 | 4096 | 8 Tc | |
| | 120 kHz | 24~40 | 512 | 1/(512*120 k) = 32 Tc | |
| | | 44~84 | 1024 | 16 Tc | |
| | | 88~168 | 2048 | 8 Tc | |
| | | 172~264 | 4096 | 4 Tc | |

From the above-provided table, the granularity is shown relative to the frequency (FR1 or FR2), SCS and PRB. Using this table as a baseline, multiple options for RSTD report mapping are detailed below. In the exemplary embodiments, three different types of RSTD mapping tables are provided. In a first exemplary embodiment, the RSTD mapping tables are based on the frequency and the SCS. In a second exemplary embodiment, the RSTD mapping tables are based on the frequency. In a third exemplary embodiment, the RSTD mapping tables are based on the frequency, SCS and BW. Each of these exemplary embodiments will be described in greater detail below. However, the principles described below for generating the exemplary RSTD mapping tables may be used to generate RSTD mapping tables based on different parameters or different combinations of parameters. Those skilled in the art will understand that currently the radio spectrum allocated to 5G includes frequency range 1 (FR1) (e.g., 410 megahertz (MHz) to 7125 MHz) and frequency range 2 (FR2) (e.g., 24250 MHz to 52600 MHZ). Thus, when referring to FR1 and FR2 throughout this description, it should be understood that this reference is to the current frequency ranges assigned to 5G. However, those skilled in the art will understand that the principles described herein may be extended to other frequency ranges.

According to a first exemplary embodiment, the RSTD mapping table is defined per SCS and per frequency band. The max/min values of the RSTD mapping table are the same in 5G NR as they are in LTE, i.e., the reporting values range from RSTD_0000 to RSTD_12711. The relative quantity mapping table is also used to satisfy positioning coverage requirements. The RSTD report mapping table is designed based on a baseline granularity, to be described below, with the relative quantity mapping table being based on a finer granularity.

As shown in the exemplary Table 6 below, the mapping table comprises five entries for the five combinations of frequency and SCS: FR1 and SCS=15 kHz, FR1 and SCS=30 kHz, FR1 and SCS=60 kHz, FR2 and SCS=60 kHz and FR2 and SCS=120 kHz. In one exemplary embodiment, the time chip granularity for each entry may be chosen as the finest granularity among the different BWs within each SCS (as may be seen relative to Table 5). In other exemplary embodiments, different granularities may be selected (e.g., the coarsest granularity, a mean or average granularity, etc.).

TABLE 6 basic time chip granularity without oversampling for different SCS

| | FFT size without OS | Basic time chip granularity without oversampling |
|---|---|---|
| SCS FR1 | 15 kHz | 32 Tc |
| | 30 kHz | 16 Tc |
| | 60 kHz | 16 Tc |
| SCS FR2 | 60 kHz | 8 Tc |
| | 120 kHz | 4 Tc |

The oversampling rate of RSTD reporting may be set to 2 for the RSTD range from RSTD_2260 to RSTD_10451 (i.e., range 2 as defined above), to be explained further below. Thus, in the exemplary Table 7 shown below, the mapping table for range 2 has granularities of twice the resolution of ranges 1 and 3.

TABLE 7 time chip granularity with oversampling rate = 2 for different SCS

| | FFT size with OS = 2 | Basic time chip granularity without oversampling |
|---|---|---|
| SCS FR1 | 15 kHz | 16 Tc |
| | 30 kHz | 8 Tc |
| | 60 kHz | 8 Tc |
| SCS FR2 | 60 kHz | 4 Tc |
| | 120 kHz | 2 Tc |

When RSTD measurement is performed between PRSs with different SCS, the UE can follow the worst granularity between the two SCSs for reporting. This is also true when the PRSs have different FRs or BWs. As noted above, in 5G NR, both an RSTD report mapping table and a relative quantity mapping table will be used. The same baseline unit may be used in 5G NR as in LTE. Thus, where the unit in LTE was 1.0 $T_s$, the unit in 5G NR can be 64Tc. In 5G NR, the relative quantity mapping table provides more values to cover the different SCS in FR1 RSTD report mapping. Comparing the finest SCS of FR1 and the finest SCS of FR2, there is a 4× difference between reporting granularity for FR1 and FR2, so 16Tc can be used as the unit in FR2 cases so that the same signaling can be used for both FR1 and FR2 cases, with only the interpretation of the signaling at the network being defined. For FR2, the positioning coverage can be smaller than FR1, due to the network coverage of FR2. In one exemplary embodiment, ¼ unit from FR1 for FR2 is used (meaning the unit for FR2 can be 16Tc), the boundary of RSTD report range can be 16Tc*15391=246256Tc, and it can cover positioning measurement for distance differences up to 37.6 km.

Thus, the granularity units for FR1 are 64Tc and the granularity units for FR2 are 16Tc for the RSTD report mapping table. The relative quantity mapping table may have the same signaling granularity for all the SCSs in FR1 and FR2, but the applicability for each signaling value shall be defined per SCS per FR. For example, in FR1, 15 kHz SCS has 16Tc oversampled granularity for range 2 and 32Tc basic granularity, while 30 kHz/60 kHz SCS has 8Tc oversampled granularity for range 2. To design the relative quantity mapping table, if the relative quantity can be exactly divided by 8Tc but not by 16Tc, that means it will be applied for 30 KHz/60 kHz SCS with oversampling in range 2. If the relative quantity can be exactly divided by 16Tc, that means it can be applied for 15 kHz SCS with oversampling in range 2 and also can be applied for 30 kHz/60 KHz SCS with the whole RSTD report range.

The RSTD report mapping table for FR1 for the first embodiment is shown below as Table 8, while the relative quantity mapping table for FR1 is shown below as Table 9.

TABLE 8

RSTD report mapping for FR1

| Reported Value | Measured Quality Value | Unit |
|---|---|---|
| RSTD_0000 | −15391 > RSTD | 64 Tc |
| RSTD_0001 | −15391 ≤ RSTD < −15386 | 64 Tc |
| . . . | . . . | . . . |
| RSTD_2258 | −4106 ≤ RSTD < −4101 | 64 Tc |
| RSTD_2259 | −4101 ≤ RSTD < −4096 | 64 Tc |
| RSTD_2260 | −4096 ≤ RSTD < −4095 | 64 Tc |
| RSTD_2261 | −4095 ≤ RSTD < −4094 | 64 Tc |
| . . . | . . . | . . . |

TABLE 8-continued

RSTD report mapping for FR1

| Reported Value | Measured Quality Value | Unit |
|---|---|---|
| RSTD_6353 | −3 ≤ RSTD < −2 | 64 Tc |
| RSTD_6354 | −2 ≤ RSTD < −1 | 64 Tc |
| RSTD_6355 | −1 ≤ RSTD < 0 | 64 Tc |
| RSTD_6356 | 0 < RSTD ≤ 1 | 64 Tc |
| RSTD_6357 | 1 < RSTD ≤ 2 | 64 Tc |
| RSTD_6358 | 2 < RSTD ≤ 3 | 64 Tc |
| . . . | . . . | . . . |
| RSTD_10450 | 4094 < RSTD ≤ 4095 | 64 Tc |
| RSTD_10451 | 4095 < RSTD ≤ 4096 | 64 Tc |
| RSTD_10452 | 4096 < RSTD ≤ 4101 | 64 Tc |
| RSTD_10453 | 4101 < RSTD ≤ 4106 | 64 Tc |
| . . . | . . . | . . . |
| RSTD_12709 | 15381 < RSTD ≤ 15386 | 64 Tc |
| RSTD_12710 | 15386 < RSTD ≤ 15391 | 64 Tc |
| RSTD_12711 | 15391 < RSTD | 64 Tc |

TABLE 9

Relative quantity mapping for different SCS in FR1

| Reported Relative Quantity Value | Measured Relative Quantity Value, $\Delta_{RSTD}$ | Unit | Applicable SCS (kHz) | Applicable RSTD report range in table x-1 |
|---|---|---|---|---|
| RSTD_delta_0 | 0 | $T_C$ | 15<br>30/60 | all RSTD reported values in table x-1 |
| RSTD_delta_1 | 8 | $T_C$ | 15<br>30/60 | NA<br>from RSTD_2260 to RSTD_10451 in table x-1 |
| RSTD_delta_2 | 16 | $T_C$ | 15<br>30/60 | from RSTD_2260 to RSTD_10451 in table x-1<br>all RSTD reported values in table x-1 |
| RSTD_delta_3 | 24 | $T_C$ | 15<br>30/60 | NA<br>from RSTD_2260 to RSTD_10451 in table x-1 |
| RSTD_delta_4 | 32 | $T_C$ | 15<br>30/60 | all RSTD reported values in table x-1 |
| RSTD_delta_5 | 40 | $T_C$ | 15<br>30/60 | NA<br>from RSTD_2260 to RSTD_10451 in table x-1 |
| RSTD_delta_6 | 48 | $T_C$ | 15<br>30/60 | from RSTD_2260 to RSTD_10451 in table x-1<br>all RSTD reported values in table x-1 |
| RSTD_delta_7 | 56 | $T_C$ | 15<br>30/60 | NA<br>from RSTD_2260 to RSTD_10451 in table x-1 |
| RSTD_delta_8 | 64 | $T_C$ | 15<br>30/60 | all RSTD reported values in table x-1 |
| RSTD_delta_9 | 80 | $T_C$ | 15<br>30/60 | NA<br>all RSTD reported values in table x-1 |
| RSTD_delta_10 | 96 | $T_C$ | 15<br>30/60 | all RSTD reported values in table x-1 |
| RSTD_delta_11 | 112 | $T_C$ | 15<br>30/60 | NA<br>all RSTD reported values in table x-1 |
| RSTD_delta_12 | 128 | $T_C$ | 15<br>30/60 | all RSTD reported values in table x-1 |
| RSTD_delta_13 | 144 | $T_C$ | 15<br>30/60 | NA<br>all RSTD reported values in table x-1 |
| RSTD_delta_14 | 160 | $T_C$ | 15<br>30/60 | all RSTD reported values in table x-1 |
| RSTD_delta_15 | 176 | $T_C$ | 15<br>30/60 | NA<br>all RSTD reported values in table x-1 |
| RSTD_delta_16 | 192 | $T_C$ | 15<br>30/60 | all RSTD reported values in table x-1 |
| RSTD_delta_17 | 208 | $T_C$ | 15<br>30/60 | NA<br>all RSTD reported values in table x-1 |
| RSTD_delta_18 | 224 | $T_C$ | 15<br>30/60 | all RSTD reported values in table x-1 |
| RSTD_delta_19 | 240 | $T_C$ | 15<br>30/60 | NA<br>all RSTD reported values in table x-1 |
| RSTD_delta_20 | 256 | $T_C$ | 15<br>30/60 | all RSTD reported values in table x-1 |
| RSTD_delta_21 | 272 | $T_C$ | 15<br>30/60 | NA<br>all RSTD reported values in table x-1 |
| RSTD_delta_22 | 288 | $T_C$ | 15<br>30/60 | all RSTD reported values in table x-1 |
| RSTD_delta_23 | 304 | $T_C$ | 15<br>30/60 | NA<br>all RSTD reported values in table x-1 |

For FR1, the UE will report a reference quantity based on Table 8 and a relative quantity defined in Table 9, so that the difference between the measured RSTD quantity and the lower bound of the corresponding range from Table 9 is between $\Delta_{RSTD}$ and $\Delta_{RSTD}$+resolutionStep. resolutionStep is 16Tc for 15 kHz SCS, 8Tc for 30 kHz SCS and 8Tc for 60 kHz in range 2, and 32Tc for 15 kHz SCS, 16Tc for 30 kHz SCS and 16Tc SCS for 60 kHz in range 1 and range 3.

The RSTD report mapping table for FR2 for the first embodiment is shown below as Table 10, while the relative quantity mapping table for FR2 is shown below as Table 11.

TABLE 10

RSTD report mapping for FR2

| Reported Value | Measured Quality Value | Unit |
|---|---|---|
| RSTD_0000 | −15391 > RSTD | 16 Tc |
| RSTD_0001 | −15391 ≤ RSTD < −15386 | 16 Tc |
| . . . | . . . | . . . |
| RSTD_2258 | −4106 ≤ RSTD < −4101 | 16 Tc |
| RSTD_2259 | −4101 ≤ RSTD < −4096 | 16 Tc |
| RSTD_2260 | −4096 ≤ RSTD < −4095 | 16 Tc |
| RSTD_2261 | −4095 ≤ RSTD < −4094 | 16 Tc |
| . . . | . . . | . . . |
| RSTD_6353 | −3 ≤ RSTD < −2 | 16 Tc |
| RSTD_6354 | −2 ≤ RSTD < −1 | 16 Tc |
| RSTD_6355 | −1 ≤ RSTD < 0 | 16 Tc |
| RSTD_6356 | 0 < RSTD ≤ 1 | 16 Tc |
| RSTD_6357 | 1 < RSTD ≤ 2 | 16 Tc |
| RSTD_6358 | 2 < RSTD ≤ 3 | 16 Tc |
| . . . | . . . | . . . |
| RSTD_10450 | 4094 < RSTD ≤ 4095 | 16 Tc |
| RSTD_10451 | 4095 < RSTD ≤ 4096 | 16 Tc |
| RSTD_10452 | 4096 < RSTD ≤ 4101 | 16 Tc |
| RSTD_10453 | 4101 < RSTD ≤ 4106 | 16 Tc |
| . . . | . . . | . . . |
| RSTD_12709 | 15381 < RSTD ≤ 15386 | 16 Tc |
| RSTD_12710 | 15386 < RSTD ≤ 15391 | 16 Tc |
| RSTD_12711 | 15391 < RSTD | 16 Tc |

TABLE 11

Relative quantity mapping for FR2

| Reported Relative Quantity Value | Measured Relative Quantity Value, $\Delta_{RSTD}$ | Unit | Applicable SCS (kHz) | Applicable RSTD report range in table y-1 |
|---|---|---|---|---|
| RSTD_delta_0 | 0 | $T_C$ | 60 | all RSTD reported values in table y-1 |
| | | | 120 | |
| RSTD_delta_1 | 2 | $T_C$ | 60 | NA |
| | | | 120 | from RSTD_2260 to RSTD_10451 in table y-1 |
| RSTD_delta_2 | 4 | $T_C$ | 60 | from RSTD_2260 to RSTD_10451 in table y-1 |
| | | | 120 | all RSTD reported values in table y-1 |
| RSTD_delta_3 | 6 | $T_C$ | 60 | NA |
| | | | 120 | from RSTD_2260 to RSTD_10451 in table y-1 |
| RSTD_delta_4 | 8 | $T_C$ | 60 | all RSTD reported values in table y-1 |
| | | | 120 | |
| RSTD_delta_5 | 10 | $T_C$ | 60 | NA |
| | | | 120 | from RSTD_2260 to RSTD_10451 in table y-1 |
| RSTD_delta_6 | 12 | $T_C$ | 60 | from RSTD_2260 to RSTD_10451 in table y-1 |
| | | | 120 | all RSTD reported values in table y-1 |
| RSTD_delta_7 | 14 | $T_C$ | 60 | NA |
| | | | 120 | from RSTD_2260 to RSTD_10451 in table y-1 |
| RSTD_delta_8 | 16 | $T_C$ | 60 | all RSTD reported values in table y-1 |
| | | | 120 | |
| RSTD_delta_9 | 20 | $T_C$ | 60 | NA |
| | | | 120 | all RSTD reported values in table y-1 |
| RSTD_delta_10 | 24 | $T_C$ | 60 | all RSTD reported values in table y-1 |
| | | | 120 | |
| RSTD_delta_11 | 28 | $T_C$ | 60 | NA |
| | | | 120 | all RSTD reported values in table y-1 |
| RSTD_delta_12 | 32 | $T_C$ | 60 | all RSTD reported values in table y-1 |
| | | | 120 | |
| RSTD_delta_13 | 36 | $T_C$ | 60 | NA |
| | | | 120 | all RSTD reported values in table y-1 |
| RSTD_delta_14 | 40 | $T_C$ | 60 | all RSTD reported values in table y-1 |
| | | | 120 | |
| RSTD_delta_15 | 44 | $T_C$ | 60 | NA |
| | | | 120 | all RSTD reported values in table y-1 |
| RSTD_delta_16 | 48 | $T_C$ | 60 | all RSTD reported values in table y-1 |
| | | | 120 | |
| RSTD_delta_17 | 52 | $T_C$ | 60 | NA |
| | | | 120 | all RSTD reported values in table y-1 |
| RSTD_delta_18 | 56 | $T_C$ | 60 | all RSTD reported values in table y-1 |
| | | | 120 | |
| RSTD_delta_19 | 60 | $T_C$ | 60 | NA |
| | | | 120 | all RSTD reported values in table y-1 |
| RSTD_delta_20 | 64 | $T_C$ | 60 | all RSTD reported values in table y-1 |
| | | | 120 | |
| RSTD_delta_21 | 68 | $T_C$ | 60 | NA |
| | | | 120 | all RSTD reported values in table y-1 |

TABLE 11-continued

Relative quantity mapping for FR2

| Reported Relative Quantity Value | Measured Relative Quantity Value, $\Delta_{RSTD}$ | Unit | Applicable SCS (kHz) | Applicable RSTD report range in table y-1 |
|---|---|---|---|---|
| RSTD_delta_22 | 72 | $T_C$ | 60 | all RSTD reported values in table y-1 |
| | | | 120 | |
| RSTD_delta_23 | 76 | $T_C$ | 60 | NA |
| | | | 120 | all RSTD reported values in table y-1 |

For FR2, the UE will report a reference quantity based on Table 10 and a relative quantity defined in Table 11, so that the difference between the measured RSTD quantity and the lower bound of the corresponding range from Table 10 is between $\Delta_{RSTD}$ and $\Delta_{RSTD}$+resolutionStep. resolutionStep is 4Tc for 60 KHz SCS and 2Tc for 120 kHz SCS in range 2, and 8Tc for 60 kHz SCS and 4Tc for 120 kHz SCS in range 1 and range 3.

The above-described first embodiment standardizes five cases for the RSTD report mapping table. Standardizing five cases is somewhat complicated but achieves a quantization gain for more accurate reporting. A simpler RSTD report mapping table, having reduced complexity and maintaining a relatively good quantization gain, is described below in the second embodiment.

According to the second exemplary embodiment, the RSTD mapping table is defined per frequency band. In other words, the table differentiates between FRs and chooses the finest or worst granularity within each FR. If RSTD measurement is performed between FR1 and FR2, then the UE can follow the FR1 granularity report, i.e. the worse granularity. The basic granularity of the RSTD report mapping table is 16Tc for FR1 and 4Tc for FR2. The oversampling rate may be set to 2, similar to the first embodiment described above, for the second range of RSTD reporting values, so the granularity after oversampling is 8Tc for the second range in FR1 and 2Tc for the second range in FR2. For FR1, 64Tc is used as the baseline unit for the RSTD report mapping, while for FR2, 16Tc is used as the baseline unit, for the reasons described above.

The RSTD report mapping table for FR1 for the second embodiment is shown below as Table 12, while the relative quantity mapping table for FR1 is shown below as Table 13.

TABLE 12

RSTD report mapping for FR1

| Reported Value | Measured Quality Value | Unit |
|---|---|---|
| RSTD_0000 | −15391 > RSTD | 64 Tc |
| RSTD_0001 | −15391 ≤ RSTD < −15386 | 64 Tc |
| . . . | . . . | . . . |
| RSTD_2258 | −4106 ≤ RSTD < −4101 | 64 Tc |
| RSTD_2259 | −4101 ≤ RSTD < −4096 | 64 Tc |
| RSTD_2260 | −4096 ≤ RSTD < −4095 | 64 Tc |
| RSTD_2261 | −4095 ≤ RSTD < −4094 | 64 Tc |
| . . . | . . . | . . . |
| RSTD_6353 | −3 ≤ RSTD < −2 | 64 Tc |
| RSTD_6354 | −2 ≤ RSTD < −1 | 64 Tc |
| RSTD_6355 | −1 ≤ RSTD < 0 | 64 Tc |
| RSTD_6356 | 0 < RSTD ≤ 1 | 64 Tc |
| RSTD_6357 | 1 < RSTD ≤ 2 | 64 Tc |
| RSTD_6358 | 2 < RSTD ≤ 3 | 64 Tc |
| . . . | . . . | . . . |
| RSTD_10450 | 4094 < RSTD ≤ 4095 | 64 Tc |
| RSTD_10451 | 4095 < RSTD ≤ 4096 | 64 Tc |
| RSTD_10452 | 4096 < RSTD ≤ 4101 | 64 Tc |
| RSTD_10453 | 4101 < RSTD ≤ 4106 | 64 Tc |
| . . . | . . . | . . . |
| RSTD_12709 | 15381 < RSTD ≤ 15386 | 64 Tc |
| RSTD_12710 | 15386 < RSTD ≤ 15391 | 64 Tc |
| RSTD_12711 | 15391 < RSTD | 64 Tc |

TABLE 13

Relative quantity mapping for FR1

| Reported Relative Quantity Value | Measured Relative Quantity Value, $\Delta_{RSTD}$ | Unit | Applicability |
|---|---|---|---|
| RSTD_delta_0 | 0 | $T_C$ | For all RSTD reported values in table x-1 |
| RSTD_delta_1 | 8 | $T_C$ | For the range from RSTD_2260 to RSTD_10451 in table x-1 |
| RSTD_delta_2 | 16 | $T_C$ | For all RSTD reported values in table x-1 |
| RSTD_delta_3 | 24 | $T_C$ | For the range from RSTD_2260 to RSTD_10451 in table x-1 |
| RSTD_delta_4 | 32 | $T_C$ | For all RSTD reported values in table x-1 |
| RSTD_delta_5 | 40 | $T_C$ | For the range from RSTD_2260 to RSTD_10451 in table x-1 |
| RSTD_delta_6 | 48 | $T_C$ | For all RSTD reported values in table x-1 |
| RSTD_delta_7 | 46 | $T_C$ | For the range from RSTD_2260 to RSTD_10451 in table x-1 |
| RSTD_delta_8 | 64 | $T_C$ | For all RSTD reported values in table x-1 |
| RSTD_delta_9 | 80 | $T_C$ | |
| RSTD_delta_10 | 96 | $T_C$ | |
| RSTD_delta_11 | 112 | $T_C$ | |
| RSTD_delta_12 | 128 | $T_C$ | |

TABLE 13-continued

| Relative quantity mapping for FR1 | | | |
|---|---|---|---|
| Reported Relative Quantity Value | Measured Relative Quantity Value, $\Delta_{RSTD}$ | Unit | Applicability |
| RSTD_delta_13 | 144 | $T_C$ | |
| RSTD_delta_14 | 160 | $T_C$ | |
| RSTD_delta_15 | 176 | $T_C$ | |
| RSTD_delta_16 | 192 | $T_C$ | |
| RSTD_delta_17 | 208 | $T_C$ | |
| RSTD_delta_18 | 224 | $T_C$ | |
| RSTD_delta_19 | 240 | $T_C$ | |
| RSTD_delta_20 | 256 | $T_C$ | |
| RSTD_delta_21 | 272 | $T_C$ | |
| RSTD_delta_22 | 288 | $T_C$ | |
| RSTD_delta_23 | 304 | $T_C$ | |

For FR1, the UE will report a reference quantity based on Table 12 and a relative quantity defined in Table 13, so that the difference between the measured RSTD quantity and the lower bound of the corresponding range from Table 12 is between $\Delta_{RSTD}$ and $\Delta_{RSTD}$+resolutionStep. resolutionStep is 8Tc in the second range, and 16Tc in the first range and the third range.

The RSTD report mapping table for FR2 for the second embodiment is shown below as Table 14, while the relative quantity mapping table for FR2 is shown below as Table 15.

TABLE 14

| RSTD report mapping for FR2 | | |
|---|---|---|
| Reported Value | Measured Quality Value | Unit |
| RSTD_0000 | −15391 > RSTD | 16 Tc |
| RSTD_0001 | −15391 ≤ RSTD < −15386 | 16 Tc |
| . . . | . . . | . . . |
| RSTD_2258 | −4106 ≤ RSTD < −4101 | 16 Tc |
| RSTD_2259 | −4101 ≤ RSTD < −4096 | 16 Tc |
| RSTD_2260 | −4096 ≤ RSTD < −4095 | 16 Tc |

TABLE 14-continued

| RSTD report mapping for FR2 | | |
|---|---|---|
| Reported Value | Measured Quality Value | Unit |
| RSTD_2261 | −4095 ≤ RSTD < −4094 | 16 Tc |
| . . . | . . . | . . . |
| RSTD_6353 | −3 ≤ RSTD < −2 | 16 Tc |
| RSTD_6354 | −2 ≤ RSTD < −1 | 16 Tc |
| RSTD_6355 | −1 ≤ RSTD < 0 | 16 Tc |
| RSTD_6356 | 0 < RSTD ≤ 1 | 16 Tc |
| RSTD_6357 | 1 < RSTD ≤ 2 | 16 Tc |
| RSTD_6358 | 2 < RSTD ≤ 3 | 16 Tc |
| . . . | . . . | . . . |
| RSTD_10450 | 4094 < RSTD ≤ 4095 | 16 Tc |
| RSTD_10451 | 4095 < RSTD ≤ 4096 | 16 Tc |
| RSTD_10452 | 4096 < RSTD ≤ 4101 | 16 Tc |
| RSTD_10453 | 4101 < RSTD ≤ 4106 | 16 Tc |
| . . . | . . . | . . . |
| RSTD_12709 | 15381 < RSTD ≤ 15386 | 16 Tc |
| RSTD_12710 | 15386 < RSTD ≤ 15391 | 16 Tc |
| RSTD_12711 | 15391 < RSTD | 16 Tc |

TABLE 15

| Relative quantity mapping for FR2 | | | |
|---|---|---|---|
| Reported Relative Quantity Value | Measured Relative Quantity Value, $\Delta_{RSTD}$ | Unit | Applicability |
| RSTD_delta_0 | 0 | $T_C$ | For all RSTD reported values in table y-1 |
| RSTD_delta_1 | 2 | $T_C$ | For the range from RSTD_2260 to RSTD_10451 in table y-1 |
| RSTD_delta_2 | 4 | $T_C$ | For all RSTD reported values in table y-1 |
| RSTD_delta_3 | 6 | $T_C$ | For the range from RSTD_2260 to RSTD_10451 in table y-1 |
| RSTD_delta_4 | 8 | $T_C$ | For all RSTD reported values in table y-1 |
| RSTD_delta_5 | 10 | $T_C$ | For the range from RSTD_2260 to RSTD_10451 in table y-1 |
| RSTD_delta_6 | 12 | $T_C$ | For all RSTD reported values in table y-1 |
| RSTD_delta_7 | 14 | $T_C$ | For the range from RSTD_2260 to RSTD_10451 in table y-1 |
| RSTD_delta_8 | 16 | $T_C$ | For all RSTD reported values in table y-1 |
| RSTD_delta_9 | 20 | $T_C$ | |
| RSTD_delta_10 | 24 | $T_C$ | |
| RSTD_delta_11 | 28 | $T_C$ | |
| RSTD_delta_12 | 32 | $T_C$ | |
| RSTD_delta_13 | 36 | $T_C$ | |
| RSTD_delta_14 | 40 | $T_C$ | |
| RSTD_delta_15 | 44 | $T_C$ | |
| RSTD_delta_16 | 48 | $T_C$ | |
| RSTD_delta_17 | 52 | $T_C$ | |
| RSTD_delta_18 | 56 | $T_C$ | |
| RSTD_delta_19 | 60 | $T_C$ | |

TABLE 15-continued

Relative quantity mapping for FR2

| Reported Relative Quantity Value | Measured Relative Quantity Value, $\Delta_{RSTD}$ | Unit | Applicability |
|---|---|---|---|
| RSTD_delta_20 | 64 | $T_C$ | |
| RSTD_delta_21 | 68 | $T_C$ | |
| RSTD_delta_22 | 72 | $T_C$ | |
| RSTD_delta_23 | 76 | $T_C$ | |

For FR2, the UE will report a reference quantity based on Table 14 and a relative quantity defined in Table 15, so that the difference between the measured RSTD quantity and the lower bound of the corresponding range from Table 15 is between $\Delta_{RSTD}$ and $\Delta_{RSTD}$+resolutionStep. resolutionStep is 2Tc in the second range, and 4Tc in the first range and the third range.

Thus, the first and second embodiments provide relatively simple and accurate reporting frameworks for RSTD values. According to a third embodiment, the RSTD reporting tables may be differentiated by all three of the aforementioned considerations affecting granularity, i.e. FR, SCS and BW (recall Table 5 discussed above). The report mapping table in this embodiment would allow the UE to differentiate the accuracy performance associated with different BW sizes. The tables for the third embodiments are not included herein but those skilled in the art would understand how to construct the tables based on the principles described herein for construction of the tables for the first and second embodiments.

Figure 4:
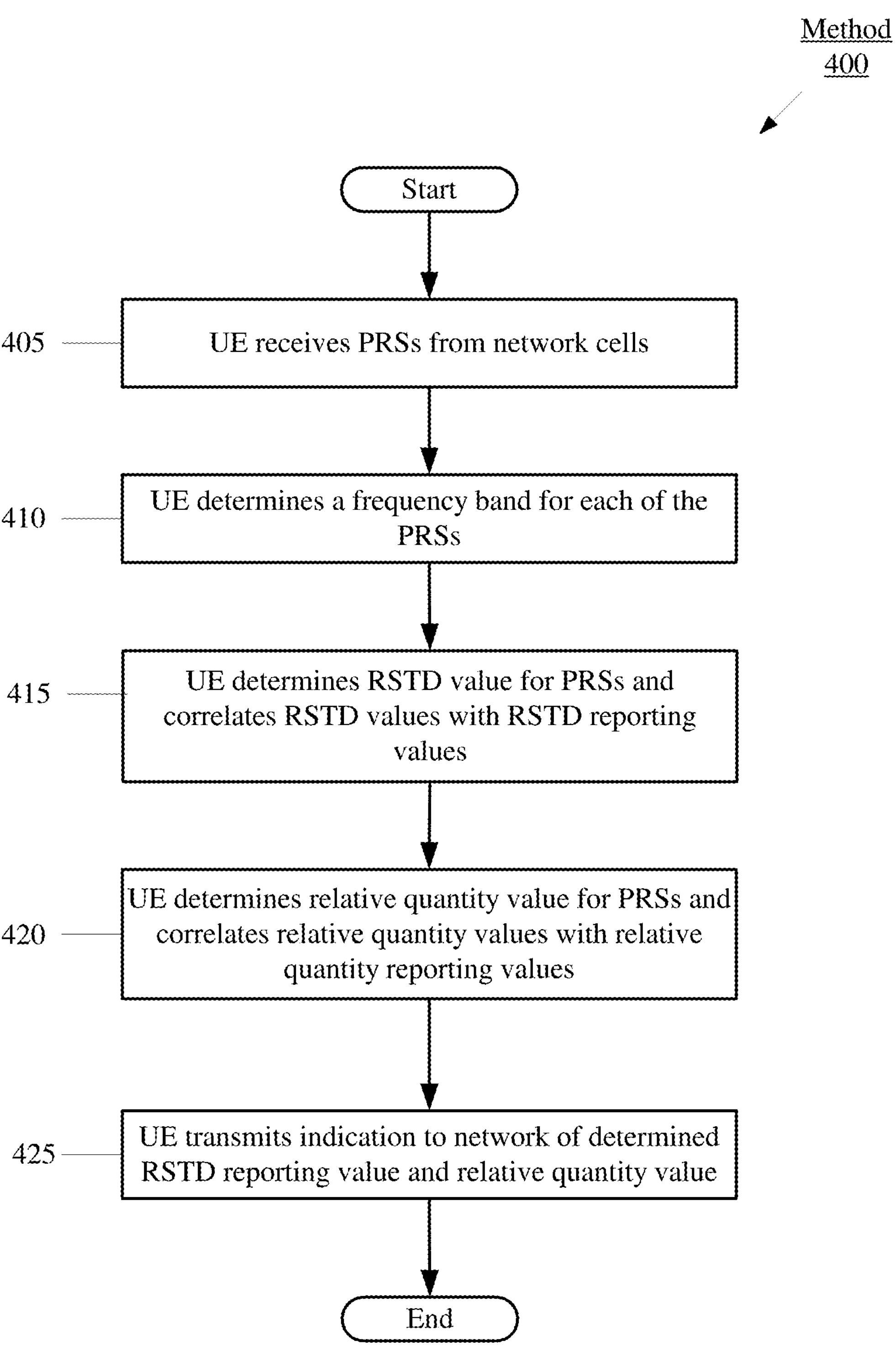
FIG. 4 shows a method implemented at a UE for RSTD measurement report mapping for UE positioning in 5G NR according to various exemplary embodiments.

FIG. 4 shows a method 400 implemented at a UE for RSTD measurement report mapping for UE positioning in 5G NR. The UE may be the UE 110 discussed above with regard to FIGS. 1-3.

In 405, the UE receives a PRS from at least three network cells. The network cells may be the gNBs 120A-120C discussed above with regard to FIG. 3.

In 410, the UE determines at least a frequency band used by each of the network cells to transmit the PRS. As discussed above in the second exemplary embodiment, the UE may differentiate by frequency band. In other embodiments, the UE may determine a SCS (in accordance with the first exemplary embodiment) and/or a BW (in accordance with the third exemplary embodiment) for each of the PRS.

In 415, the UE determines RSTD values for the PRSs and correlates the RSTD values with the RSTD reporting value from the appropriate RSTD report mapping table. In this embodiment, where only FR is used, Table 12 or 14 would be used by the UE to determine the RSTD reporting value.

In 420, the UE determines a relative quantity value for the PRSs and correlates the relative quantity value with the relative quantity reporting value from the appropriate RSTD quantity mapping table. In this embodiment, where only FR is used, Table 13 or 15 would be used by the UE to determine the relative quantity value.

In 425, the UE transmits an indication to the network of the determined RSTD reporting value and the relative quantity value. The UE may transmit the indication to any of the base stations from which the PRSs were received or may transmit the indication another way. From the reported values, the network may determine a position of the UE in accordance with OTDOA procedures.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. An apparatus comprising processing circuitry configured to:

process positioning reference signals (PRS) transmitted by a reference cell;

process PRS transmitted by a neighbor cell;

determine reference signal time difference (RSTD) values based on the PRS transmitted by the reference cell and neighbor cell;

determine a reporting granularity for reporting the RSTD values to a network;

determine RSTD reporting values based on the RSTD values and the reporting granularity; and generate, for transmission to the network, an indication of the RSTD reporting values.

2. The apparatus of claim 1, wherein the reporting granularity is based on a time $(T)=T_c 2^k$, where k is a configuration parameter with a minimum value of 0 and Tc is a baseline time granularity unit.

3. The apparatus of claim 2, wherein a value of k is based on the reference cell or the neighbor cell transmitting the corresponding PRS in frequency range 1 (FR1).

4. The apparatus of claim 3, wherein the value of k is an integer value in the range of 2-5.

5. The apparatus of claim 2, wherein a value of k is based on both the reference cell and the neighbor cell transmitting the corresponding PRS in frequency range 2 (FR2).

6. The apparatus of claim 5, wherein the value of k is an integer value in the range of 0-5.

7. The apparatus of claim 1, wherein the RSTD reporting values are determined from an RSTD report mapping table defined by standards.

8. A user equipment (UE), comprising:

transceiver circuitry configured to communicate with a network; and processing circuitry communicatively coupled to the transceiver circuitry and configured to:

process positioning reference signals (PRS) transmitted by a reference cell;

process PRS transmitted by a neighbor cell;

determine reference signal time difference (RSTD) values based on the PRS transmitted by the reference cell and neighbor cell;

determine a reporting granularity for reporting the RSTD values to the network;

determine RSTD reporting values based on the RSTD values and the reporting granularity; and generate, for transmission to the network, an indication of the RSTD reporting values.

9. The UE of claim 8, wherein the reporting granularity is based on a time $(T)=T_c 2^k$, where k is a configuration parameter with a minimum value of 0 and Tc is a baseline time granularity unit.

10. The UE of claim 9, wherein a value of k is based on the reference cell or the neighbor cell transmitting the corresponding PRS in frequency range 1 (FR1).

11. The UE of claim 10, wherein the value of k is an integer value in the range of 2-5.

12. The UE of claim 9, wherein a value of k is based on both the reference cell and the neighbor cell transmitting the corresponding PRS in frequency range 2 (FR2).

13. The UE of claim 12, wherein the value of k is an integer value in the range of 0-5.

14. The UE of claim 8, wherein the RSTD reporting values are determined from an RSTD report mapping table defined by standards.

15. A method, comprising:

processing positioning reference signals (PRS) transmitted by a reference cell;

processing PRS transmitted by a neighbor cell;

determining reference signal time difference (RSTD) values based on the PRS transmitted by the reference cell and neighbor cell;

determining a reporting granularity for reporting the RSTD values to a network;

determining RSTD reporting values based on the RSTD values and the reporting granularity; and transmitting, to the network, an indication of the RSTD reporting values.

16. The method of claim 15, wherein the reporting granularity is based on a time $(T)=T_c 2^k$, where k is a configuration parameter with a minimum value of 0 and Tc is a baseline time granularity unit.

17. The method of claim 16, wherein a value of k is based on the reference cell or the neighbor cell transmitting the corresponding PRS in frequency range 1 (FR1).

18. The method of claim 17, wherein the value of k is an integer value in the range of 2-5.

19. The method of claim 16, wherein a value of k is based on both the reference cell and the neighbor cell transmitting the corresponding PRS in frequency range 2 (FR2).

20. The method of claim 19, wherein the value of k is an integer value in the range of 0-5.

* * * * *